(12) United States Patent
Cummins

(10) Patent No.: US 6,666,526 B1
(45) Date of Patent: Dec. 23, 2003

(54) MOLDED WHEEL ASSEMBLY

(75) Inventor: Steven M. Cummins, Columbia City, IN (US)

(73) Assignee: Spartech Corporation, Clayton, MO (US)

( * ) Notice: Subject to any disclaimer, the term of this patent is extended or adjusted under 35 U.S.C. 154(b) by 0 days.

(21) Appl. No.: 10/078,636

(22) Filed: Feb. 19, 2002

Related U.S. Application Data

(60) Provisional application No. 60/277,606, filed on Mar. 21, 2001.

(51) Int. Cl.[7] .................. B60B 23/00; B60B 35/00
(52) U.S. Cl. ............... 301/112; 301/111.04; 301/124.1
(58) Field of Search .................. 301/111.01, 112, 301/113, 118, 119, 120, 121, 122, 111.04, 111.05, 111.06, 111.07, 124.1, 125–126, 131–136, 64.701–64.705

(56) References Cited

U.S. PATENT DOCUMENTS

| | | | |
|---|---|---|---|
| 895,842 A | * 8/1908 | Chambers et al. | 411/213 |
| 2,402,693 A | * 6/1946 | Summerbell | 411/340 |
| 4,043,685 A | * 8/1977 | Hyams | 403/19 |
| 4,913,610 A | * 4/1990 | Olivieri | 411/352 |
| 5,188,430 A | * 2/1993 | Chiu | 301/111.01 |
| 5,215,356 A | * 6/1993 | Lin | 301/111.07 |
| 5,277,480 A | * 1/1994 | Chiu | 301/111.07 |
| 5,494,340 A | * 2/1996 | Cheng | 301/111.07 |
| 6,024,416 A | * 2/2000 | Chen et al. | 301/121 |
| 6,260,930 B1 | * 7/2001 | Peres | 301/122 |
| 6,361,121 B1 | * 3/2002 | Morris | 301/112 |
| 6,464,305 B2 | * 10/2002 | Markling | 301/111.03 |
| 6,520,597 B1 | * 2/2003 | Markling | 301/64.701 |

* cited by examiner

*Primary Examiner*—S. Joseph Morano
*Assistant Examiner*—Long Bao Nguyen
(74) *Attorney, Agent, or Firm*—Botkin & Hall, LLP

(57) ABSTRACT

A wheel and axle assembly in which the wheel carries a metal clip secured within a pocket formed in the wheel. The clip extends into an axial bore formed in the wheel. An axle is fitted into the wheel bore engaging the metal clip to secure the axle against withdrawal or longitudinal movement while permitting rotation of the wheel relative to the axle.

4 Claims, 5 Drawing Sheets

MOLDED WHEEL ASSEMBLY

CROSS REFERENCE TO RELATED APPLICATION

This is a Continuation of Provisional Application Ser. No. 60/277,606, Filed Mar. 21, 2001.

SUMMARY OF THE INVENTION

This invention relates to a wheel assembly and will have particular application to a combination axle and molded wheel.

In this invention the molded wheel is provided pockets into which metal clips are placed. The axle is inserted into the wheel through a central bore to engage the clips which interlock the axle to the wheel. In this manner, injection molded plastic or blow molded plastic wheels can be utilized with axles in interlocked fashion which firmly secures the wheel to the axle against longitudinal withdrawing movement while permitting rotational movement of the wheel relative to the axle.

Accordingly, it is an object of this invention to provide a wheel assembly which includes an axle and wheel and which can be easily assembled in a simple and rapid manner.

Another object of this invention is to provide a wheel assembly which includes an injection or blow molded wheel connected to a metal axle by a metal clip.

Still another object of this invention is to provide a wheel assembly that includes a wheel and axle connection having a longer useful life.

Other objects of the invention will become apparent upon a reading of the following description.

DESCRIPTION OF THE PREFERRED EMBODIMENTS

Figure 1:
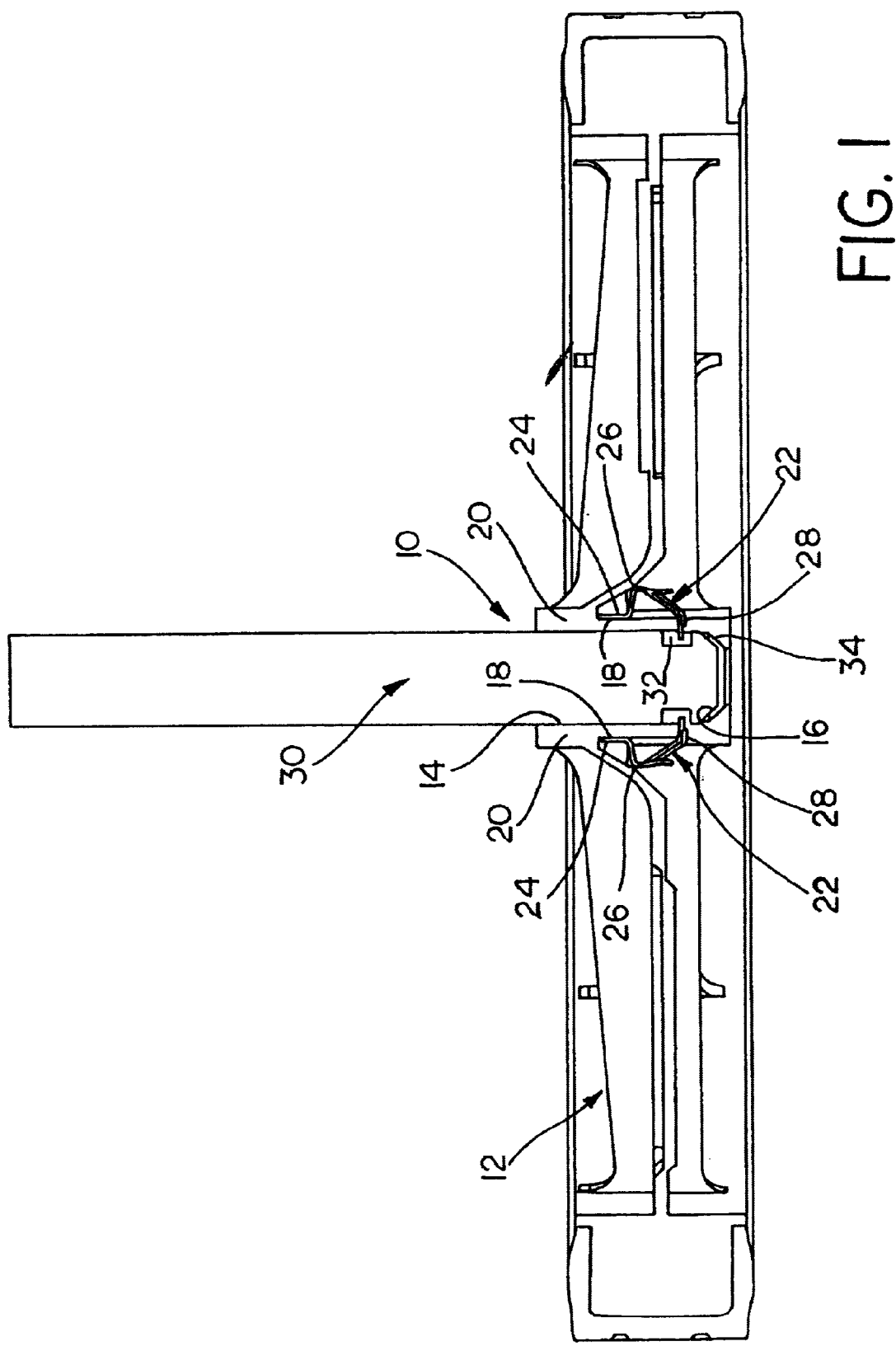
FIG. 1 is a fragmentary sectional view of one embodiment of a wheel assembly shown in assembled form.

Wheel assembly 10 shown in FIG. 1 includes a wheel 12, which for this embodiment is depicted in injection-molded form and of plastic composition. Wheel 12 has a central bore 14 formed in it. Bore 14 is axially located in the wheel and includes a shouldered end 16. Formed in wheel 12 are pockets 18. Pockets 18 are diametrically located on opposite sides of bore 14 with an access opening or slot 20 extending between each pocket and bore 14.

Figure 2:
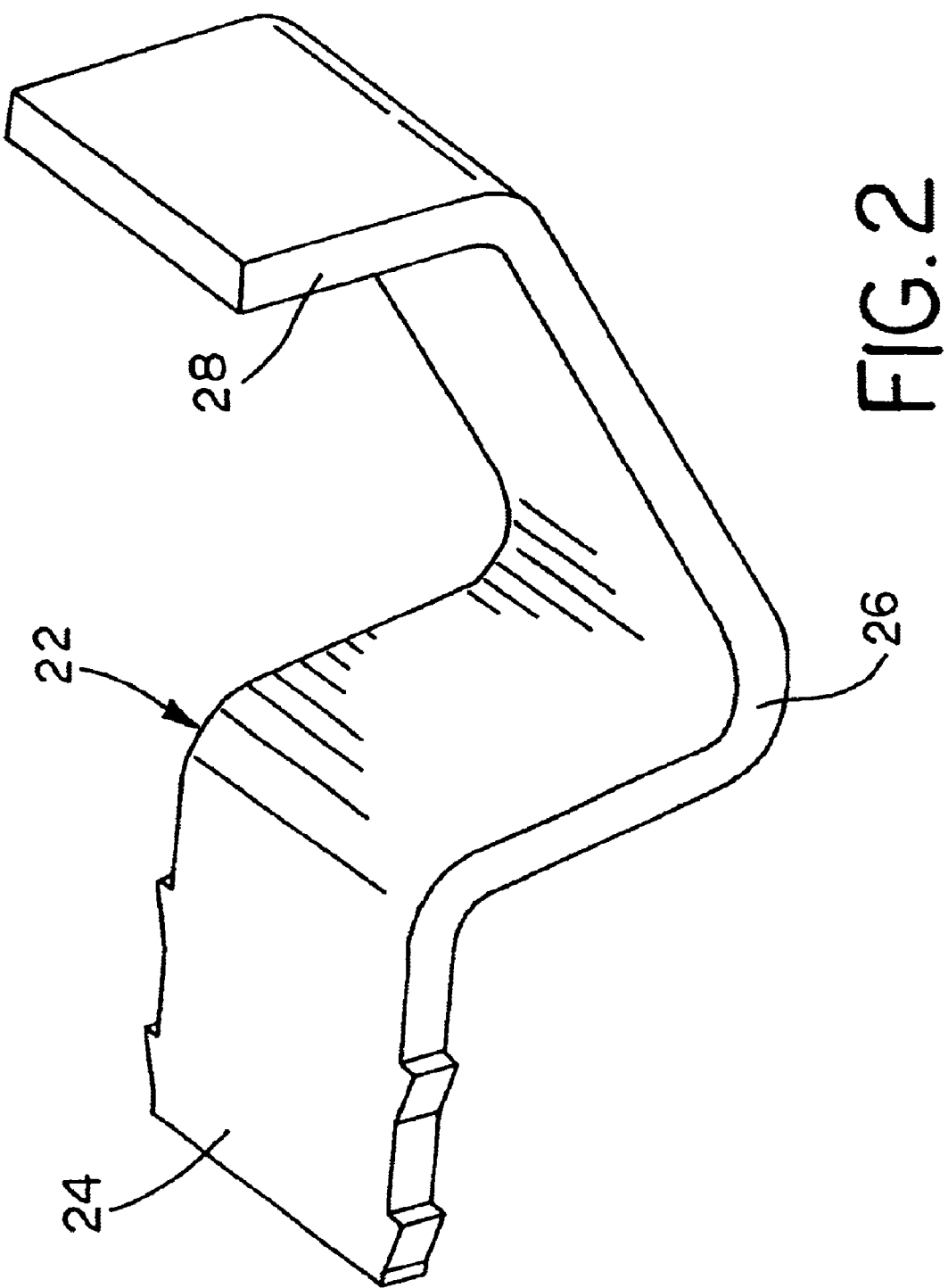
FIG. 2 is a perspective view of the clip utilized to secure the axle within the hub of the wheel.

Into each pocket 18 is inserted a lock clip 22 which is preferably in the form of spring metal. Each lock clip 22 as best seen in FIG. 2 includes a toothed end 24, an in turned bend 26, and a catch end 28. A clip 22 is inserted into and secured at its toothed end 24 in each pocket 18 in wheel 12 and positioned so that its catch end 28 extends through access opening 20 into central bore 14 of the wheel.

An axle 30, preferably of metal composition, is provided with an annular groove 32 at one end which further terminates in a bevel 34. Axle 30 is inserted into bore 14 of wheel 12 with beveled end 34 contacting the protruding catch ends 28 of clips 22 to cause the clips to be spread or sprung outwardly, passing over the end of the axle and snap fitting into groove 32. In this manner, the axle was interlocked with wheel 12 and prevented from being longitudinally withdrawn from bore 14 of the wheel yet allowing the wheel to rotate about the axle.

Figure 3:
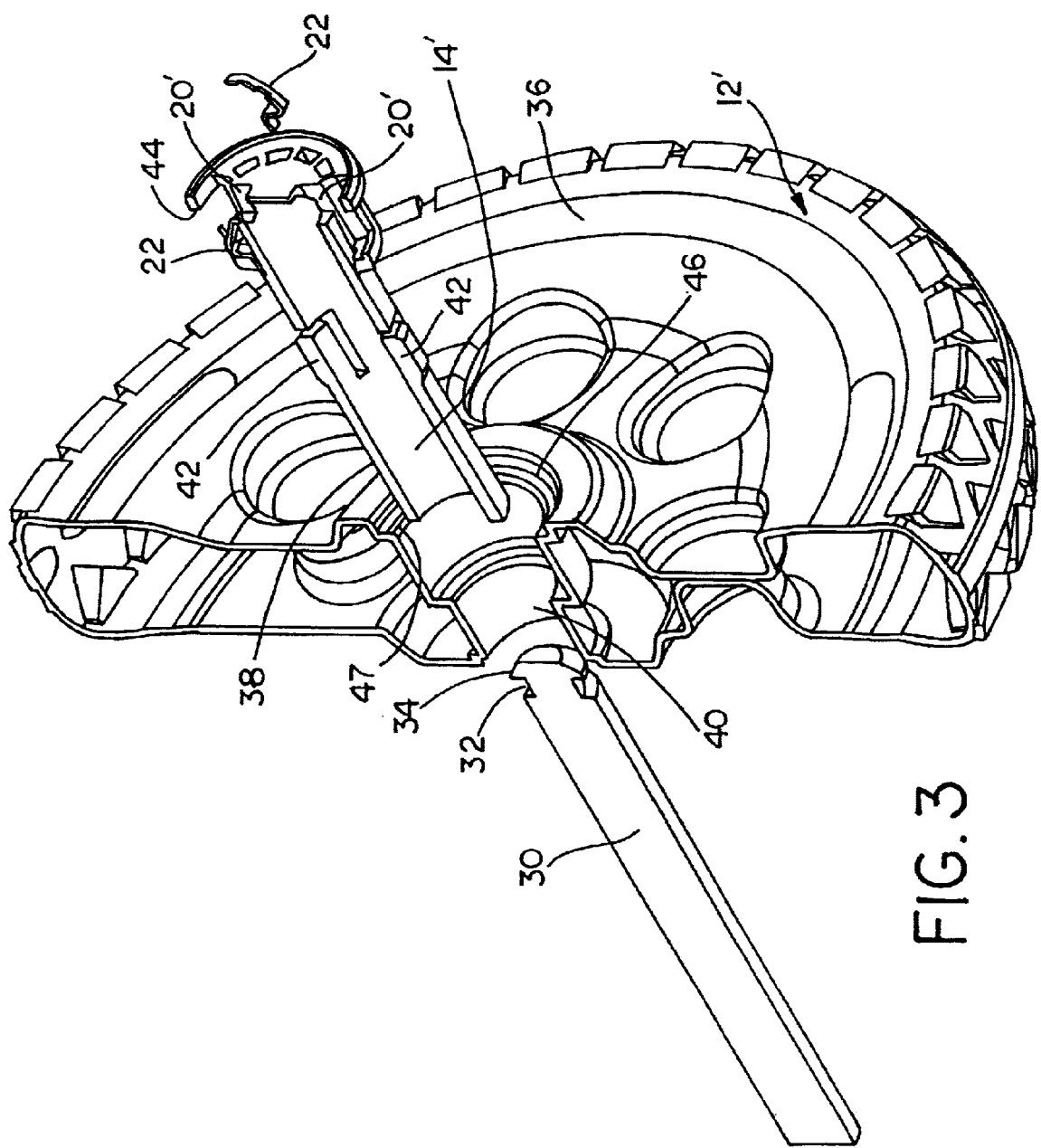
FIG. 3 is a fragmentary perspective view of the component parts of another embodiment of the wheel assembly of this invention shown in separated form for illustrative purposes.
Figure 4:
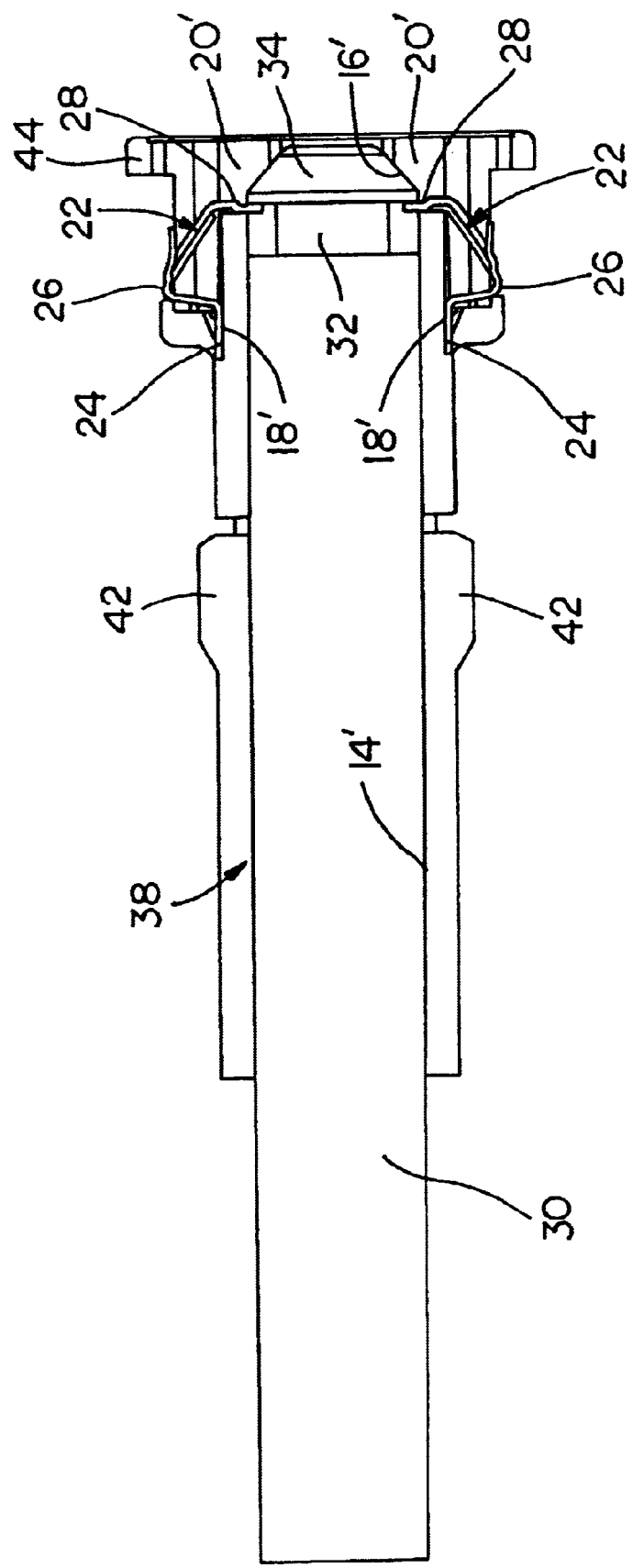
FIG. 4 is a longitudinal sectional view of the hubcap of the embodiment of FIG. 3 shown connected to the axle by clips.
Figure 5:
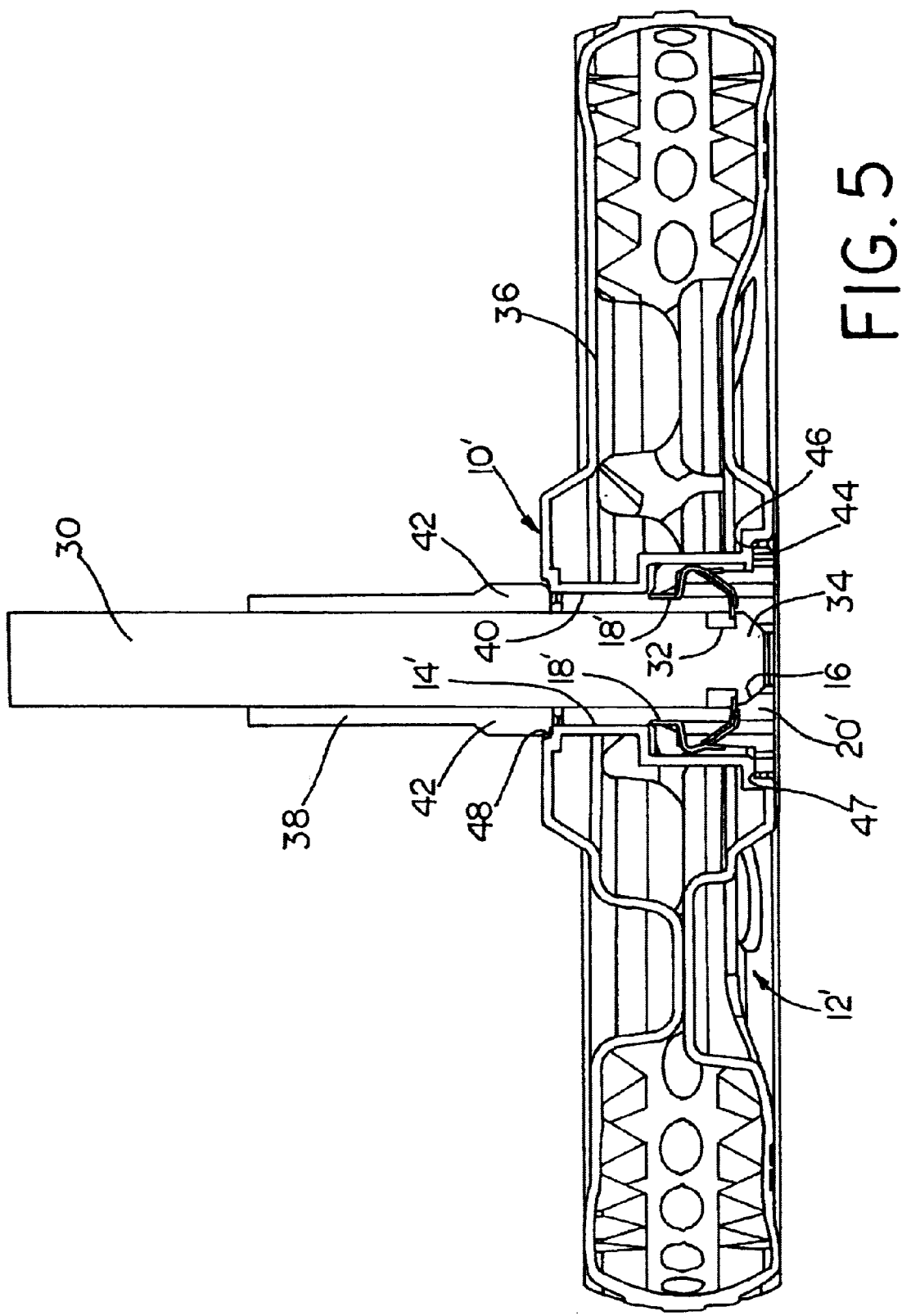
FIG. 5 is a fragmentary sectional view of the embodiment of FIG. 3 showing the wheel assembly in assembled form.

The embodiment of wheel assembly 10' shown in FIGS. 3–5 make use of a wheel 12' which includes a blow molded plastic wheel part 36. Unlike injection molded wheels, blow molded wheels are of hollow construction. As such and in order to accommodate this construction, a sleeved hubcap part 38 is provided and used in conjunction with the wheel part 36. Wheel part 36 is formed with an axial bore 40. Hubcap part 38 includes a plurality of exterior protruding spring tabs 42. The exterior end of hubcap part 38 includes an annular outturned flange 44. Pockets 18' are formed in hubcap part 38 along with access openings or slots 20 which extend from pockets 18' to bore 14' in the hubcap part. Wheel part 36 at the exterior of its bore 40 is recessed to form an annular shoulder 47.

In assembling wheel assembly 10', hub cap part 38 is fitted snugly into bore 40 of wheel part 36 until its flange 44 contacts shoulder 47 of the wheel part. During insertion of the hubcap part its inwardly flexed tabs 42 contact the wheel part and due to their bevel are flexed inwardly. Upon full insertion of the hub cap part into wheel part bore 40 tabs 42 are freed from bore 40 and are permitted to spring outwardly to engage the inner surface 48 of the wheel part has shown in FIG. 5. This interlocks the hubcap part with the wheel part. Axle 30 is now inserted into the central bore 14' of the hub cap part with its beveled end 34 engaging the catch ends 28 of the previously inserted lock clips 22 now carried by the hub cap part in its pockets 18', causing the clips to be flexed outwardly until their catch ends 28 spring inwardly into groove 32 of the axle to interlock the axle with the hub cap part so as to prevent longitudinal withdrawal of the axle from the hub cap part while permitting rotation of the hub cap and wheel parts about the axle.

The wheel assembly 10, 10' described herein will find use in such applications as lawnmowers, refuse collecting cans, wagons, and other types of wheeled devices. The invention is not to be limited to the details above given but it may be modified within the scope of the appended claims.

What I claim is:

1. A wheel and axle assembly comprising a wheel having a central bore, a pocket formed in said wheel, an opening in said wheel extending from said pocket into said bore, a clip secured in said pocket and extending through said opening into said bore, an axle fitted into said bore, said axle having an annular groove, said clip fitting into said axle groove to secure the axle against longitudinal withdrawal from said bore while permitting rotation of said wheel about said axle.

2. The assembly of claim 1 and another said pocket formed in said wheel oppositely located across said bore from said first mentioned pocket, another opening in said wheel extending from said other pocket into said bore, another clip secured in said other pocket and extending through said last mentioned opening into said bore, said other clip fitting into said axle groove.

3. The assembly of claim 1 wherein said wheel includes a wheel part and a hubcap part, said wheel part having an axial bore therein, said hubcap part being sleeve shaped and having said first mentioned bore extending longitudinally therein, said hubcap part having said pocket formed therein with said opening extending from said pocket into said first mentioned bore, said clip secured in said pocket and extending into said first mentioned bore, said hubcap part snap fitted into said wheel part bore, said axle fitted into said first mentioned bore in said hubcap part, said clip extending through said hubcap part opening into said first mentioned bore and axle groove.

4. The assembly of claim 1 wherein said clip includes a toothed end for insertion into said pocket in engagement with said wheel, an intermediate outturned bend, and a catch end for engagement with said axle within said bore at said axle groove.

* * * * *